(12) United States Patent
Moore et al.

(10) Patent No.: US 11,301,501 B2
(45) Date of Patent: *Apr. 12, 2022

(54) PREDICTIVE GENERATION OF SEARCH SUGGESTIONS

(71) Applicant: GOOGLE LLC, Mountain View, CA (US)

(72) Inventors: Amanda M. Moore, San Francisco, CA (US); Alireza Ali, Sunnyvale, CA (US); Michal R. Grabowski, San Francisco, CA (US); Jocelyn C. Lin, Mountain View, CA (US); Evan H. Parker, Atherton, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/989,846

(22) Filed: Aug. 10, 2020

(65) Prior Publication Data

US 2020/0372052 A1 Nov. 26, 2020

Related U.S. Application Data

(63) Continuation of application No. 15/648,297, filed on Jul. 12, 2017, now Pat. No. 10,740,369, which is a (Continued)

(51) Int. Cl.
*G06F 16/00* (2019.01)
*G06F 16/332* (2019.01)
(Continued)

(52) U.S. Cl.
CPC .......... *G06F 16/3322* (2019.01); *G06F 16/30* (2019.01); *G06F 16/35* (2019.01);
(Continued)

(58) Field of Classification Search
None
See application file for complete search history.

(56) References Cited

U.S. PATENT DOCUMENTS 7,966,321 B2 * 6/2011 Wolosin .............. G06F 16/9537
707/728
8,051,077 B2 * 11/2011 Carter ................. G06F 16/9537
707/724

(Continued)

*Primary Examiner* — Bai D Vu
(74) *Attorney, Agent, or Firm* — Marshall, Gerstein & Borun LLP (57) ABSTRACT

A method of generating search suggestions includes receiving an indication of a current location of the user device. After a user accesses a search function on the user device and before the user submits a search request, the method includes determining search results associated with locations in proximity to the current location of the user device, using query log data indicating selections of past search results by users after presentation of the past search results in response to respective past queries. The method also includes determining relative positioning of the search results based on the number of users that selected each search result, determining categories associated with the search results, grouping the search results by the determined categories; and sending the grouped search results and the one or more categories associated with the search results to the user device for display according to the determined relative positioning.

19 Claims, 6 Drawing Sheets

Related U.S. Application Data continuation of application No. 15/201,617, filed on Jul. 4, 2016, now abandoned, which is a continuation of application No. 13/158,796, filed on Jun. 13, 2011, now Pat. No. 9,384,266.

(51) Int. Cl.

| | | |
|---|---|---|
| *G06F 16/35* | (2019.01) | |
| *G06F 16/955* | (2019.01) | |
| *G06F 16/30* | (2019.01) | |
| *H04L 67/52* | (2022.01) | |
| *H04L 67/306* | (2022.01) | |
| *H04W 4/14* | (2009.01) | |

(52) U.S. Cl.
CPC ............ *G06F 16/955* (2019.01); *H04L 67/18* (2013.01); *H04L 67/306* (2013.01); *H04W 4/14* (2013.01)

(56) References Cited

U.S. PATENT DOCUMENTS

| | | | | |
|---|---|---|---|---|
| 8,255,382 | B2* | 8/2012 | Carpenter | G06F 16/9038 707/707 |
| 8,301,639 | B1* | 10/2012 | Myllymaki | G06F 16/90324 707/748 |
| 8,589,429 | B1* | 11/2013 | Thirumalai | G06F 16/2228 707/766 |
| 8,666,376 | B2* | 3/2014 | Ramer | G06Q 30/0257 455/414.3 |
| 9,384,266 | B1* | 7/2016 | Leicht | G06F 16/35 |
| 2003/0037050 | A1* | 2/2003 | Monteverde | G06F 16/951 |
| 2005/0154716 | A1* | 7/2005 | Watson | G06F 16/334 |
| 2007/0050339 | A1* | 3/2007 | Kasperski | G06F 16/9032 |
| 2008/0120294 | A1* | 5/2008 | Davis | G06Q 30/02 |
| 2008/0214148 | A1* | 9/2008 | Ramer | G06F 16/635 455/414.1 |
| 2009/0119172 | A1* | 5/2009 | Soloff | G06Q 30/02 705/344 |
| 2009/0187515 | A1* | 7/2009 | Andrew | G06F 16/3322 706/12 |
| 2009/0216733 | A1* | 8/2009 | Carter | G06F 16/9537 |
| 2009/0313237 | A1* | 12/2009 | Agrawal | G06F 16/3322 |
| 2010/0070334 | A1* | 3/2010 | Monteverde | G06Q 30/0267 705/14.58 |
| 2010/0082604 | A1* | 4/2010 | Gutt | G06F 16/3326 707/721 |
| 2010/0168996 | A1* | 7/2010 | Bourque | G08G 1/096827 701/532 |
| 2010/0318538 | A1* | 12/2010 | Wyman | G06F 16/3349 707/759 |
| 2011/0040631 | A1* | 2/2011 | Eder | G06Q 30/0276 705/14.67 |
| 2011/0202514 | A1* | 8/2011 | Singh | G06F 16/29 707/706 |
| 2012/0005583 | A1* | 1/2012 | Wong | G06F 16/951 715/738 |
| 2012/0158705 | A1* | 6/2012 | Konig | G06F 16/58 707/723 |
| 2012/0166432 | A1* | 6/2012 | Tseng | G06F 16/24578 707/728 |
| 2012/0310922 | A1* | 12/2012 | Johnson | H04L 67/18 707/722 |
| 2015/0032735 | A1* | 1/2015 | Van Os | G06F 16/9537 707/722 |

* cited by examiner

PREDICTIVE GENERATION OF SEARCH SUGGESTIONS

CROSS-REFERENCE TO RELATED APPLICATIONS

The present application is a continuation of U.S. patent application Ser. No. 15/648,297, filed Jul. 12, 2017, which is a continuation of U.S. patent application Ser. No. 15/201,617, filed Jul. 4, 2016, which is a continuation of U.S. patent application Ser. No. 13/158,796, filed Jun. 13, 2011, the disclosures of which are incorporated herein by reference in its entirety for all purposes.

TECHNICAL FIELD

This specification relates to providing information relevant to user search queries.

BACKGROUND

Internet search engines identify resources, e.g., Web pages, images, text documents, and multimedia content, in response to queries submitted by users and present information about the resources in a manner that is useful to the users.

Users of search engines are often interested in information specific to their location. For example, users may want to know the local weather, or may be interested in local politics or sports. Some topics which are interesting to users of one location are less interesting to users in a different location.

A search engine allows a user to provide an input for which search results are returned in response. Some search engines can provide suggestions to the user based upon the search query the user entered. For example, some search engines provide search query suggestions based upon the current search query.

SUMMARY

This patent application describes systems and techniques for sending messages, such as short message service (SMS) messages and voice messages, from a computing device.

In general, one innovative aspect of the subject matter described in this specification can be embodied in methods that include the actions of receiving a first location from a user device. The actions include obtaining a user profile associated with a user of the user device. The actions include determining, prior to receiving a search request, search results associated with locations in proximity to the first location using the user profile. The actions also include sending the search results to the user device.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. Determining a plurality of search results associated with locations in proximity to the first location may include using at least one of user profile data, user social graph data, or query log data together with the first location to determine the plurality of search results. Each search result may reference a document, the document being associated with a second location in proximity to the first location. The actions may include determining a query suggestion based on the first location. The actions may include sending the query suggestion to the user device. Determining the query suggestion based on the first location may include using at least one of user profile data, social graph data or query log data together with the first location to determine the query suggestion. Determining query suggestions based on the first location may include identifying queries submitted by prior users in proximity to the first location. Determining query suggestions based on the first location may include obtaining a user profile associated with a user of the user device. Determining query suggestions based on the first location may include using information obtained from the user profile to identify queries submitted by prior users near the first location. Determining query suggestions may include identifying queries previously submitted by the user. Determining query suggestions may include determining one or more categories associated with the search results. Determining query suggestions may include sending the one or more categories associated with the search results to the user device. The actions may include determining one or more categories associated with the search results. The actions may include sending the one or more categories associated with the search results to the user device. Sending the search results may include sending the search results grouped by category. The actions may include receiving a partial query from the user device. The actions may include filtering the search results based on the partial query prior to sending the search results to the user device. The action may include determining a search category associated with at least one of the search results. The actions may include grouping the search results associated with the search category. The action may include providing the search category together with the search results associated with the search category to the user.

All or part of the systems and techniques described herein may be implemented as a computer program product that includes instructions that are stored on one or more non-transitory machine-readable storage media, and that are executable on one or more processing devices. Examples of non-transitory machine-readable storage media include e.g., read-only memory, an optical disk drive, memory disk drive, random access memory, or the like. All or part of the systems and techniques described herein may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

DETAILED DESCRIPTION

Figure 1:
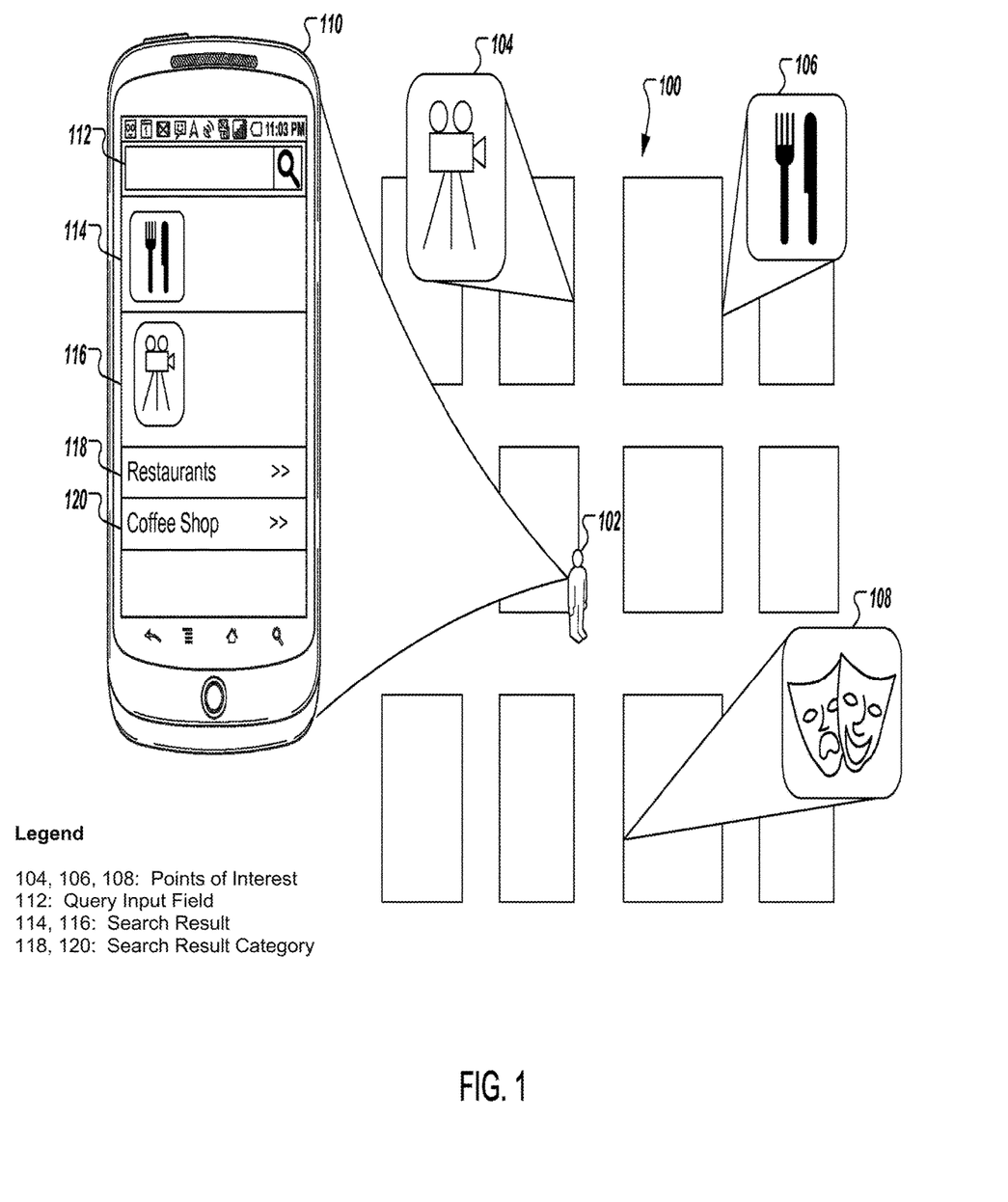
FIG. 1 illustrates an example of a user accessing local suggestions using a mobile device.

FIG. 1 illustrates an example of a user accessing local suggestions using a mobile device. In this example, a user 102 is located in an area that includes a cinema 104, a restaurant 106, and a theater 108. The user 102 accesses a search function on a mobile device 110. The search function includes a query input field 112. Before the user 102 enters a query into the query input field 112, the mobile device 110, working in conjunction with a search system (not shown), displays search results, query suggestions, and categories associated with the locations near the location of the user 102. For example, the mobile device 110 displays a search result 116 for the cinema 104. A location may be considered near the user if it is within a predefined distance from the mobile device (for example, within 1 mile, 2 miles, or 10 miles).

The search results displayed on the mobile device 110 can vary depending on the interests of the user 102. For example, the mobile device 110 may not display a search result corresponding to the theater 108 based on a determination that the user 102 is unlikely to be interested in such a result. For situations in which the systems discussed here collect information about users, the users may be provided with an opportunity to opt in/out of programs or features that may collect information (e.g., information about a user's preferences, a user's contributions to social content providers, user's devices, etc.).

The mobile device 110 can also display search results based on the historic popularity of previously provided search results at locations near the location of the mobile device. For example, if a significant number of prior users of the search system have selected search results associated with the restaurant 106, the mobile device may present the search result 114 on the mobile device 110. In some implementations, the relative positioning of the search results on the mobile device 110 can be determined, at least in part, based on the popularity of prior search results selected by prior users.

The mobile device can display suggested search queries based on the location of the mobile device and user profile information. For example, if a user has historically searched for "Grocery," the mobile device may display a query suggestion "Grocery." Query suggestions can also be based on historic data collected from other users. For example, if a large number of prior users have searched for "Laundromat" from locations near the mobile device, the mobile device may present "Laundromat" as a query suggestion.

In some implementations, the mobile device can group search results and query suggestions according to categories. For example, the mobile device 110 can display a restaurant category 118 or a coffee shop category 120. In some implementations, the search results determined to be most likely of interest to the user 102 are presented on the initial search screen and other search results determined to be of less interest to the user 102 are placed into categories.

Figure 2:
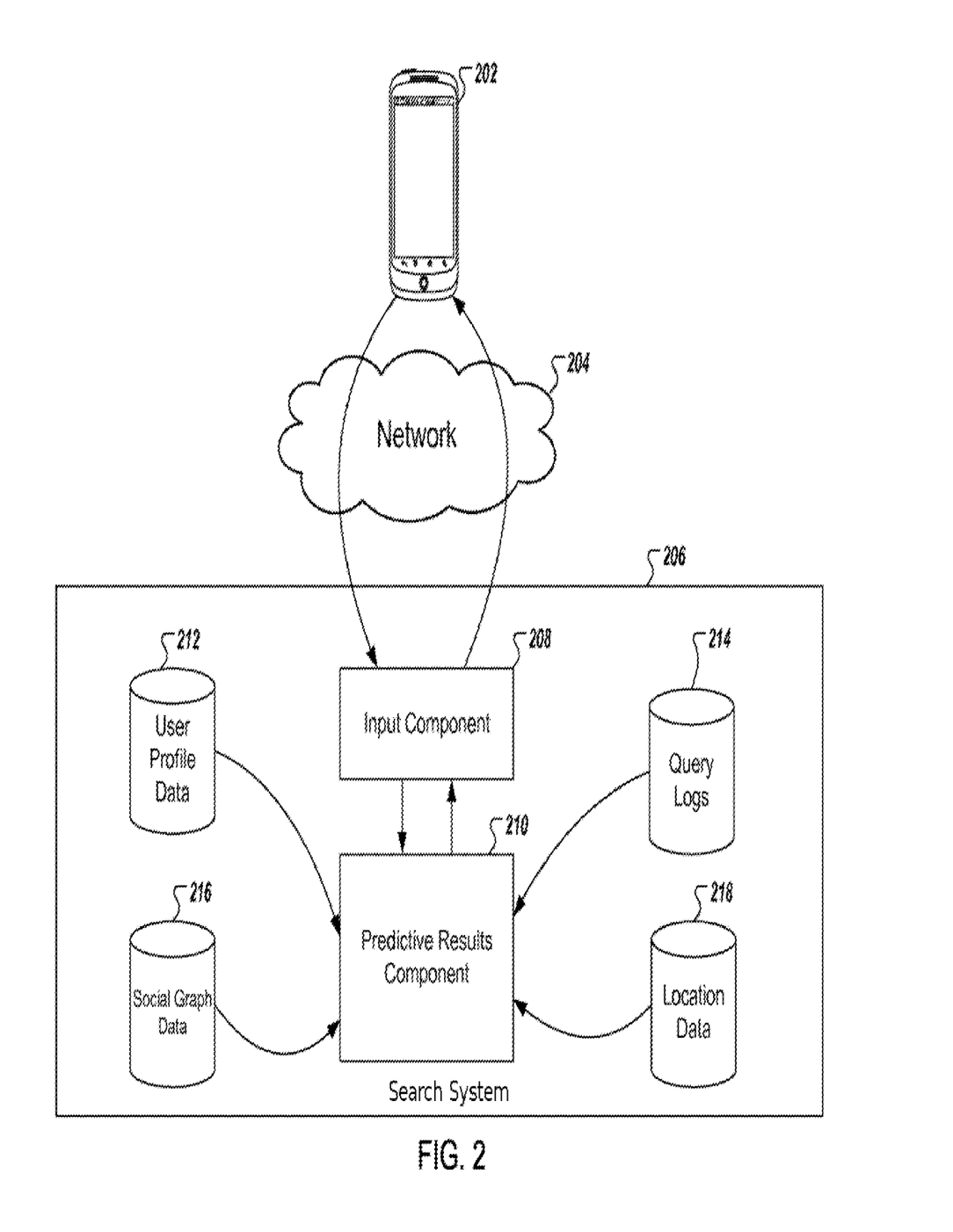
FIG. 2 illustrates an example of a system for presentation of predictive search results.

FIG. 2 illustrates an example of a system for presentation of predictive search results. The process shown in FIG. 1 may be implemented in the system. In FIG. 2, mobile device 202 sends messages to a search system 206 over a network 204, for example, the Internet. The mobile device 202 can connect to the network through a variety of methods, for example, over a cellular network, a wireless network, or another radio network. The search system 206 sends search results, query suggestions and categories to the mobile device 202. The search system 206 may perform these activities before, or while the user enters input into a query box on the mobile device 202.

In some implementations, the mobile device 202 sends an indication of the location of the mobile device 202 to the search system 206. For example, the mobile device 202 can send global positioning system (GPS) coordinates, an IP address or another indication of the location of the mobile device 202. The mobile device 202 can further send an indication of the identity of the user of the mobile device 202. For example, the mobile device 202 may send a user identifier, user name, e-mail address, or a session identifier that enables the search system to associate the user of the mobile device 202 with a user profile. The mobile device 202 can also send a partial query, such as the first few characters entered by the user (e.g. "lc") entered by the user.

In some implementations, the mobile device 202 can send each character entered by the user as part of a partial query to the search system 206 as it is entered. In other implementations, the mobile device 202 stores characters entered by the user until a minimum number of characters are stored (for example, 3) and then the mobile device 202 sends the stored characters in a partial query to the search system 206. In other implementations, the mobile device 202 waits until the user pauses when entering characters and then sends the entered characters to the search system 206. For example, the mobile device may wait until the user has stopped entering text for one second before sending the partial query including all of the entered characters to the search system 206.

The search system 206 includes an input component 208 which receives the messages from the mobile device 202. The input component 208 can verify that the message from the mobile device 202 does not indicate that the user of the mobile device 202 has submitted a search request. Verifying that the user has not submitted a search request may include verifying that the user has not used the mechanism in the user interface (e.g., pressing a search button) or any other mechanism (e.g., a voice command), to send input to the search engine indicating that the user has finished entering input. The input component 208 can also consider other factors, for example, whether the user has entered a partial query having a minimum number of characters, or whether a predetermined amount of time has passed since the user entered the last character of the partial query.

The input component 208 sends the message to a predictive results component 210. The predictive results component 210 obtains query suggestions and/or search results based on information provided by the mobile device 202. Query suggestions and/or search results can be generated using query logs 214, location data 218, user profile data 212, and social graph data 216.

Query logs 214 may include a history of search activity of prior users. The query logs 214 can include previously submitted search queries by other users and by the current user. The query logs 214 can also include indications of which search results provided in response to the previously submitted queries were selected by the other users or by the current user. Query logs 214 can be used to identify previously submitted search queries and search results that are associated with locations near the location of the mobile device 202. Previously submitted queries can be identified by examining the query logs for queries submitted by prior users from locations near the location of the mobile device 202. Previously submitted search results can be identified by examining prior query logs to identify search results which were presented in response to queries submitted by prior users from locations near to the location of the mobile device 202 and which were subsequently selected by the prior users. The previously submitted queries and previously submitted search results can be evaluated to determine if they should be presented to the user of the mobile device as predictive queries and predictive search results. In some implementations, evaluating the previously submitted queries and search results includes assigning a quality score to each previously submitted query and search result, as is discussed below.

In some implementations, each prior user session can be associated with a location. In other implementations, each previously submitted query and selected search result can be associated with a location.

The previously submitted queries can be provided with a query log quality score based on the popularity of the query at the location at which the query was submitted. Query suggestions may be provided a score based on the popularity of the search query in a given location. Query suggestions may also be provided a score based on the quality of search results generated from the query. For example, a query suggestion that previously produced search results that were subsequently selected may be considered superior to a query suggestion that did not produce any selected search results.

In some implementations, the query log quality score for the previously submitted queries and search results can be calculated at the time the message is received by the input processor 206 from the mobile device 202. For example, the query log quality score can be based on the number of times the query was submitted or the search result was selected within a predefined distance of the mobile device (for example, 2 miles).

In other implementations, the query log quality score for a previously submitted query or a selected search result can be determined prior to receiving a message from the mobile device. For example, different locations can be grouped together into regions (for example, by zip code, city or town). At regular intervals (e.g. hourly, daily, weekly, etc.), the query log quality score for a previously submitted query or a selected search result can be calculated based on the number of times the query was submitted within the region over a period of time (e.g. a week, a month, etc.).

In some implementations, queries previously submitted by the user of the mobile device 202 can be used as query suggestions. Similarly, search results selected by the user of the mobile device 202 can be used as search results.

Search results can be identified and scored based on location data 218. Location data 218 can include information associating resources with location. For example, a web page for a restaurant can be associated with the location of the restaurant. The predictive results component 210 can identify resources associated with locations near the location of the mobile device 202 as search results in which the user of the mobile device 202 may be interested. Each search result can be associated with a location quality score based on the distance between the location associated with the resource and the location of the mobile device 202.

Search results and query suggestions can be further refined using user profile data 212. For example, a profile of a user may include information that the user is interested in cinema but not interested in theater. Consequently, query suggestions and search results related to cinema may be promoted, while suggestions and results related to theater may be demoted or eliminated.

User profile data 212 can include information explicitly shared by the user. For example, the user may provide a list of hobbies and interests. The user profile data 212 can also include information implicitly identified about the user. For example, a user's previously submitted queries, selected search results, subscribed news feeds, and other collected information can identify that a user is interested in a particular topic. In general, the user may be provided with an opportunity to opt in/out of programs or features that may collect such information about the user (e.g., information about a user's preferences, a user's contributions to social content providers, user's devices, etc.). Moreover, such information about the user may be anonymized before being stored as user profile data 212.

User profile information can also include a history of other activity in which the user has engaged. For example, if the user has searched for a particular address using a mapping function associated with the mobile device, the user profile may store the recently searched address. Similarly, the predictive results component 210 may identify queries that the user has previously submitted or search results that the user has previously selected. These previously submitted queries and selected results may be presented as query suggestions and search results.

Search results and query suggestions can be further refined using social graph data 216. Generally, a social graph reflects social relationships between different users. For example, two users may have identified each other as acquaintances, friends, or colleagues. The relationship may be captured by a social graph. Social graph data 216 can be used to indicate that a user may be more or less interested in a search result or query suggestion. For example, if a member of the user's social graph makes available information indicating that he is currently at a particular restaurant, the predictive results component may determine that the user is more likely to be interested in a resource referencing that restaurant. A user is also more likely to be interested in topics that are of interest to other members in the user's social graph. Similarly, if a member of the user's social graph highly rates a restaurant, film, or other activity or experience, the predictive results component may determine that the user is more likely to be interested in a resource referencing that restaurant, film, activity or experience.

In some implementations, the search system can provide a list of categories, which are likely to be of interest to the user. The categories can be identified based on the user profile data 212, the query logs 214, the social graph data 216 and the location data 218. For example, if a user is located in Wrigleyville, Ill., the user may be presented with a baseball category. The user's profile may also provide information about categories, for example, if the user has an interest in movies, a cinema category may be presented. Categories can also be identified from search results and predictive query terms. In some implementations, categories are derived from keywords associated with resources that are associated with locations near the mobile device.

Figure 3A:
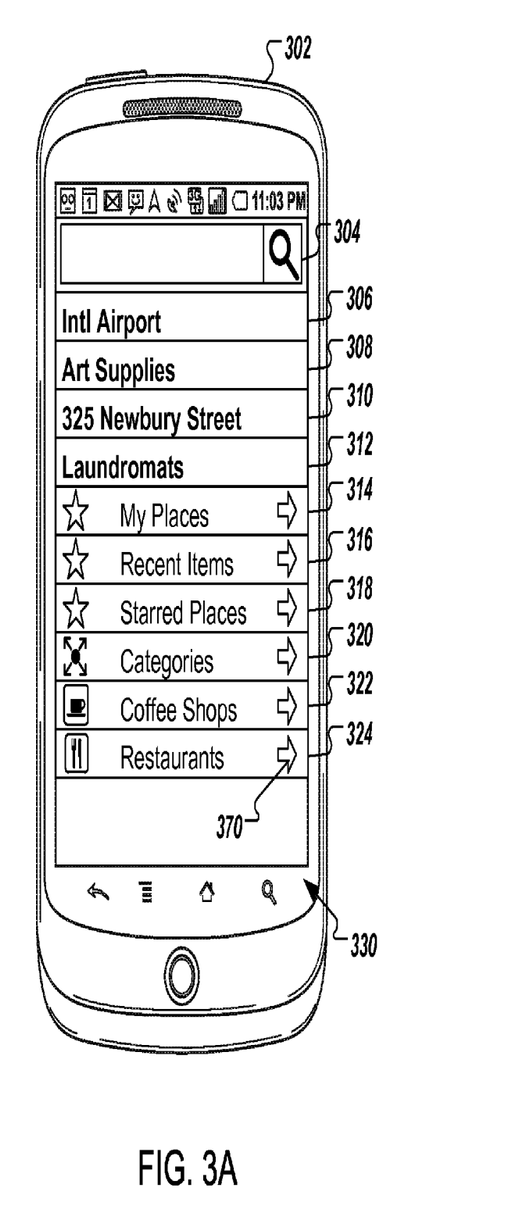
FIG. 3A-C illustrates examples of mobile devices provided with predictive search results.
Figure 3B:
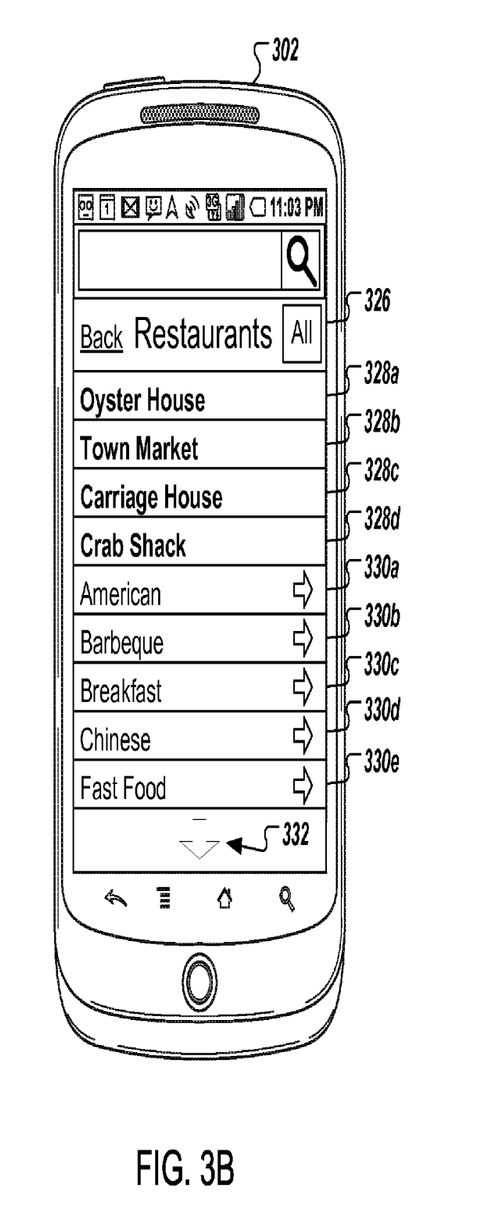
Figure 3C:
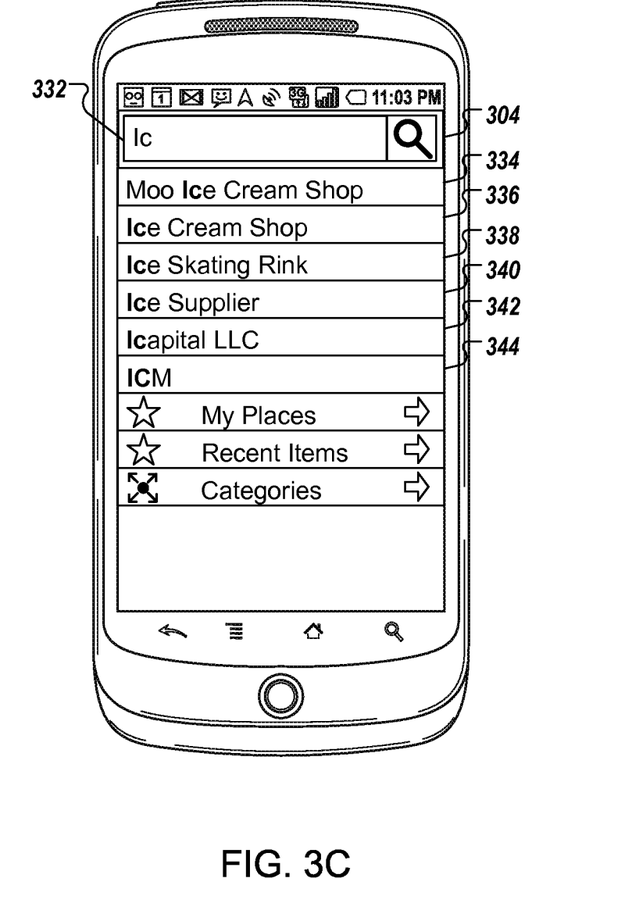

FIGS. 3A-C illustrate examples of mobile devices provided with predictive search results. Referring to FIG. 3A, a user accesses a search function on a mobile device 302. Before the user enters any information into the query input field 304, the user interface of the mobile device is populated with predictive query suggestions and search results based, at least in part, on the location of the mobile device 302. For example, the user interface may include a predictive search result for the international airport 306, an art supplies store 308, or a recently searched for address 310.

The user interface may also include query suggestions. For example, the user interface displays a query suggestion "Laundromats" 312.

The user interface may also include grouping of information the user may be interested in. For example, the "my places" 314 category may identify locations previously identified by the user. The recent items category group 316 may include search queries and search results recently obtained by the user. The starred places category 318 identifies search results that have been previously tagged by the user of the mobile device 302 and are located near the mobile device 302.

The user interface also includes a categories group 320. In some implementations, the categories group provides access to different categories that include predictive search results grouped by the content of the resource referenced by the predictive search result. In some implementations, the user interface can also display category groups directly on the user interface. For example, the mobile device 302 displays a coffee shops category 322 and a restaurants category 324.

In some implementations, the presence of an arrow 370 indicates that the item contains nested entries.

Referring to FIG. 3B, the mobile device 302 displays the restaurant category 326 on the user interface. The user interface includes predictive search results and subcategories. For example, the mobile device 302 displays search results for "oyster house" 328a, "town market" 328b, "carriage house" 328c, and "crab shack" 328d. The user interface also displays subcategories, for example, an "American" sub-category 330a, a "barbecue" sub-category 330b, a "breakfast" sub-category 330c, a "Chinese" sub-category 330d, and a "fast food" sub-category 330e.

In some implementations, a down arrow 332 indicates that the user can scroll to display more sub-categories.

Referring to FIG. 3C, the user has entered a partial query "Ic" 332 into the query input field 304. In response, the mobile device 302 sends the partial query to a search service that can provide predictive queries, categories, and search results that include the partial query. For example, the mobile device 302 displays predictive search results "Moo Ice Cream Shop" 334, "Icapital LLC" 342, and "ICM" 334. The mobile device 302 also displays predictive suggested queries "Ice Cream Shop" 336, "Ice Skating Rink" 338, and "Ice Supplier" 342.

Figure 4:
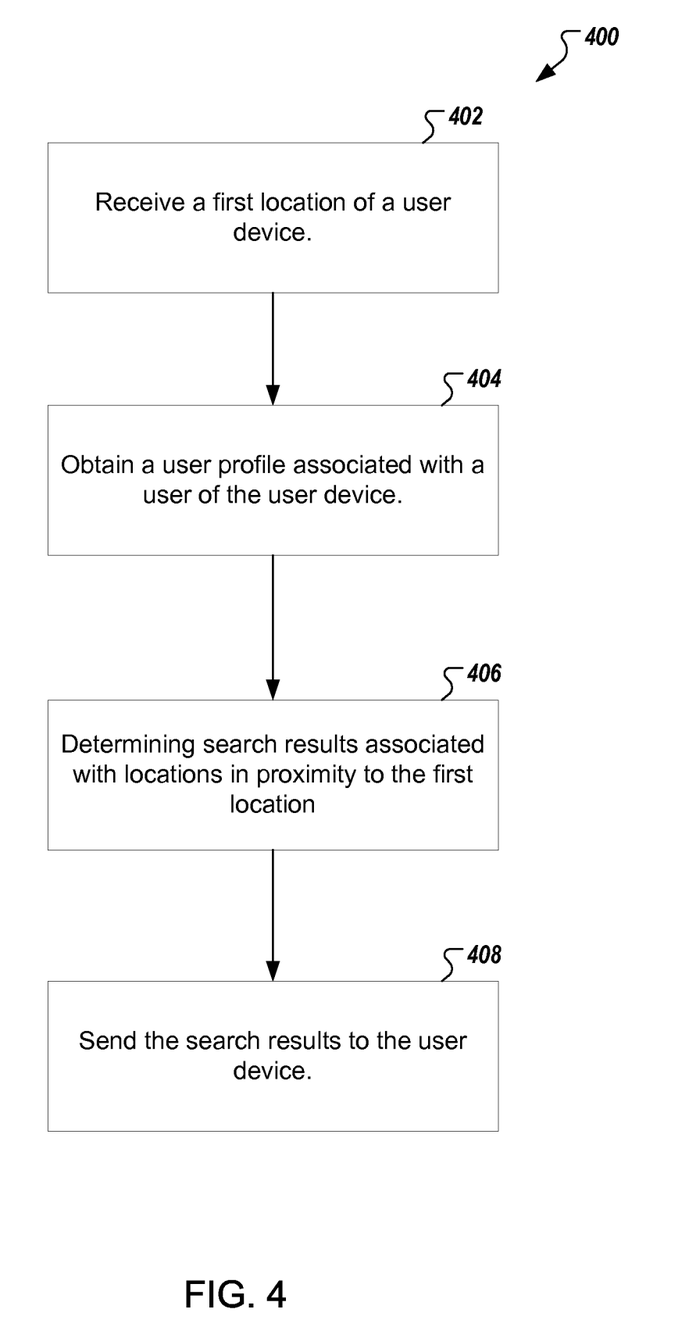
FIG. 4 is a flow chart of an example of a process for generating predictive search results.

FIG. 4 is a flow chart of an example of a process 400 for generating predictive search results. The process may be performed, for example, by the predictive results generator 210 shown in FIG. 2. For convenience, the process will be described in relation to a system performing the process.

The process receives 402 a first location of a user device. The user device can be, for example, a mobile device such as a portable computer, cellular phone, smart phone, tablet computer, or other such device. The location can be information that can be used to identify the location of the user device, such as GPS coordinates. In some implementations, an Internet Protocol address can be sufficient to identify a location of the user device. Similarly, cellular tower information associated with the user device can be used to identify the location of the user device. The location can be received, for example, as an HTTP request message sent from the user device.

The process obtains 404 a user profile associated with a user of the user device. The user can be identified by a user identifier, a cookie, or a session identifier provided by the user device. The user profile can reveal, for example, a description of the interests of the user (e.g., hobbies, search history, etc.). The user profile can also identify social graphs of the user. In some implementations, the social graph may be centered on the user (e.g. the user identifies his associates), in other implementations, the user may have identified social networks in which the user is a member.

The user profile may also include information the user has implicitly revealed. For example, if a user frequently searches for model trains, the user profile may include information indicating the user has an interest in model trains. In some implementation, the user may be provided the opportunity to opt in or opt out of such data collection and storage activities.

The process determines 406 search results associated with locations in proximity to the first location. The search results can be based on the user profile as discussed above with respect to FIG. 2. For example, if a user's profile indicates that the user is interested in model trains then resources associated with model trains and located in proximity to the user may be determined.

The process sends 408 the search results to the user device. The search results can be sent to the user device, for example, as an HTTP response message.

Figure 5:
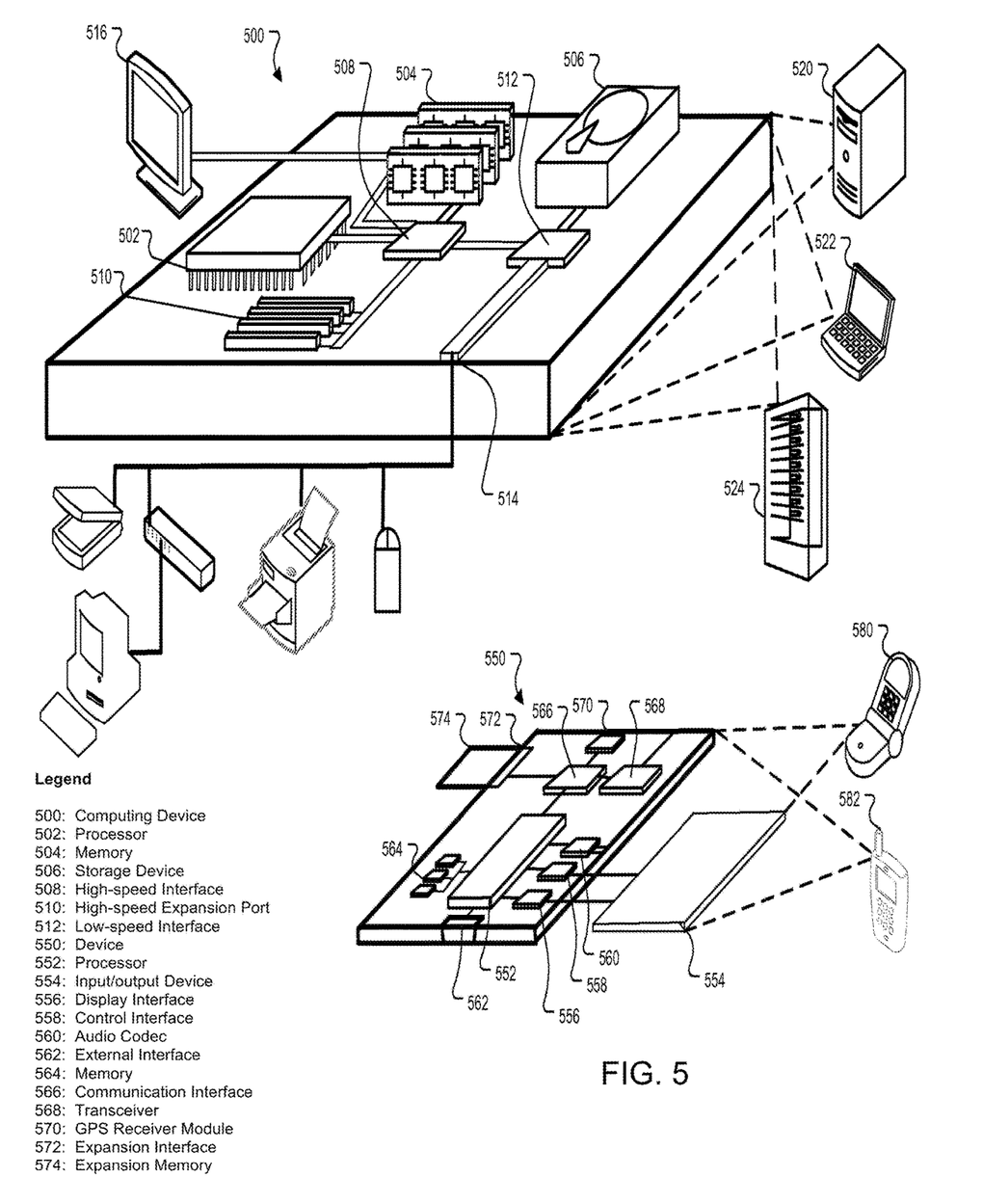
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and highspeed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, various forms of the flows shown above may be used, with steps re-ordered, added, or removed. Also, although several applications of generating predictive results and methods have been described, it should be recognized that numerous other applications are contemplated. Accordingly, other embodiments are within the scope of the following claims.

What is claimed is:

1. A method of generating search suggestions, the method comprising:
    receiving, by one or more processors from a user device, an indication of a current location of the user device;
    after a user accesses a search function on the user device and before the user submits a search request, determining search results associated with locations in proximity to the current location of the user device, using query log data indicating selections of past search results by users after presentation of the past search results in response to respective past queries, by the one or more processors;
    determining, by the one or more processors, relative positioning of the search results based on the number of two or more users that selected each search result;
    determining, by the one or more processors, categories associated with the search results;
    grouping, by the one or more processors, the search results by the determined categories;
    determining one or more subcategories of the categories associated with the search results; and
    sending the grouped search results, the one or more categories, and the one or more subcategories associated with the search results to the user device for display according to the determined relative positioning.

2. The method of claim 1, wherein determining search results associated with locations in proximity to the current location of the user device further comprises using at least one of user profile data or user social graph data together with the current location of the user device to determine the search results.

3. The method of claim 1, wherein each search result references a document, the document being associated with a second location in proximity to the current location of the user device.

4. The method of claim 1, further comprising:
    determining a query suggestion based on the current location of the user device; and
    sending the query suggestion to the user device.

5. The method of claim 4, wherein determining the query suggestion based on the current location of the user device further comprises using at least one of user profile data, social graph data or query log data together with the current location of the user device to determine the query suggestion.

6. The method of claim 5, wherein determining query suggestions based on the current location of the user device comprises:
    identifying queries submitted by prior users in proximity to the current location of the user device.

7. The method of claim 4, wherein determining query suggestions based on the current location comprises further comprises:
- obtaining a user profile associated with a user of the user device; and
- using information obtained from the user profile to identify queries submitted by prior users near the current location of the user device.

8. The method of claim 4, wherein determining query suggestions comprises: identifying queries previously submitted by the user.

9. The method of claim 1, wherein sending the grouped search results comprises sending the search results grouped by category.

10. The method of claim 1, further comprising:
- determining a search category associated with at least one of the search results;
- grouping the search results associated with the search category; and
- providing the search category together with the search results associated with the search category to the user.

11. A system comprising:
- one or more computers and one or more storage devices storing instructions that are operable, when executed by the one or more computers, to cause the one or more computers to perform operations comprising:
- receiving an indication of a current location of a user device,
- after a user accesses a search function on the user device and before the user submits a search request, determining search results associated with locations in proximity to the current location of the user device, using query log data indicating selections of past search results by users after presentation of the past search results in response to respective past queries,
- determining relative positioning of the search results based on the number of two or more users that selected each search result,
- determining categories associated with the search results,
- grouping the search results by the determined categories,
- determining one or more subcategories of the categories associated with the search results; and
- sending the grouped search results, the one or more categories, and the one or more subcategories, associated with the search results to the user device for display according to the determined relative positioning.

12. The system of claim 11, wherein determining search results associated with locations in proximity to the current location of the user device further comprises using at least one of user profile data or user social graph data together with the current location of the user device to determine the search results.

13. The system of claim 11, wherein each search result references a document, the document being associated with a second location in proximity to the current location of the user device.

14. The system of claim 11, further comprising:
- determining a query suggestion based on the current location of the user device; and
- sending the query suggestion to the user device.

15. The system of claim 14, wherein determining the query suggestion based on the current location of the user device further comprises using at least one of user profile data, social graph data or query log data together with the current location of the user device to determine the query suggestion.

16. The system of claim 15, wherein determining query suggestions based on the current location of the user device comprises:
- identifying queries submitted by prior users in proximity to the current location of the user device.

17. The system of claim 14, wherein determining query suggestions based on the current location comprises further comprises:
- obtaining a user profile associated with a user of the user device; and
- using information obtained from the user profile to identify queries submitted by prior users near the current location of the user device.

18. The system of claim 14, wherein determining query suggestions comprises: identifying queries previously submitted by the user.

19. A method comprising:
- providing, on a user device, an interactive search function with a search query input field;
- after a user accesses the search function on the user device, sending from the user device a first location of the user device;
- receiving, at one or more processors, the first location from the user device;
- determining, by one or more processors and prior to receiving a search request, search results associated with locations in proximity to the first location, wherein the search results are determined using query log data of previously submitted queries, wherein the query log data indicates selections of search results by users after presentation of the search results;
- determining relative positioning of the search results based on the number users that selected each search result;
- determining categories associated with the search results;
- grouping the search results by the determined categories;
- sending the grouped search results and the one or more categories associated with the search results to the user device for display according to the determined relative positioning;
- receiving, with the user device, the grouped search results;
- displaying, on the user device, the grouped search results in the determined relative positioning under the query input field.

* * * * *